Sept. 25, 1923.
S. GROSSMAN
RESILIENT WHEEL
Filed Jan. 31, 1920  2 Sheets-Sheet 1
1,468,714
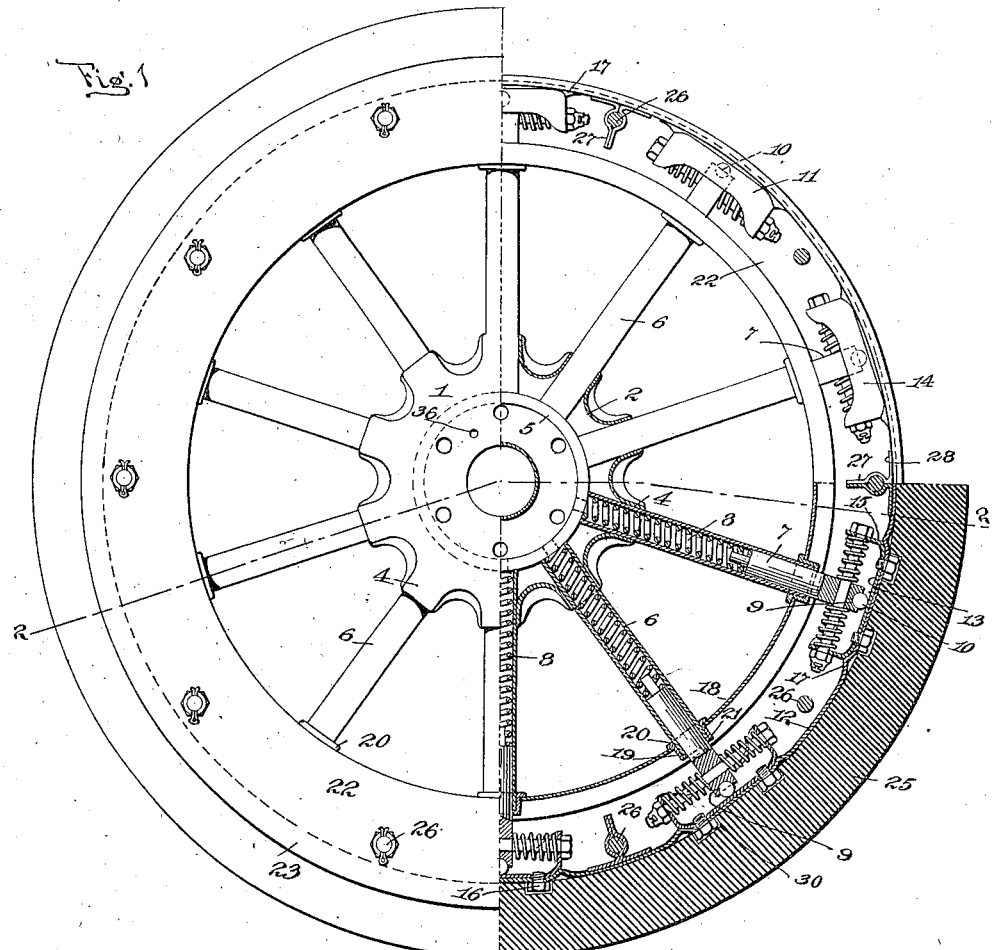
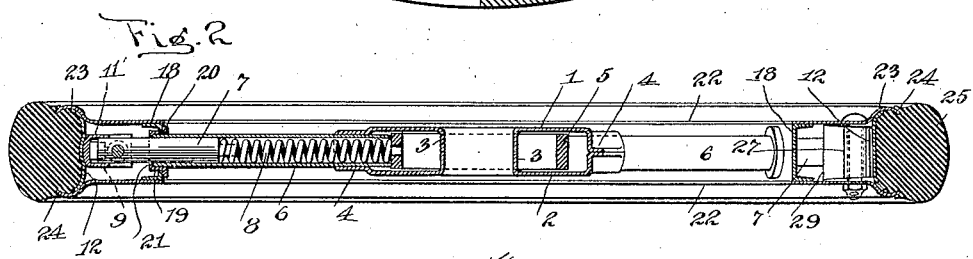
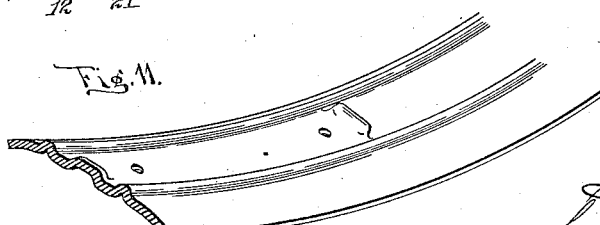
Inventor
Samuel Grossman
by Schuchty &c.
his Attorneys Sept. 25, 1923.
S. GROSSMAN
RESILIENT WHEEL
Filed Jan. 31, 1920
1,468,714
2 Sheets-Sheet 2
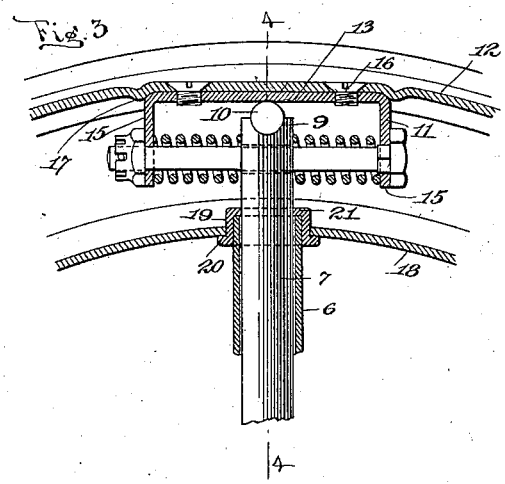
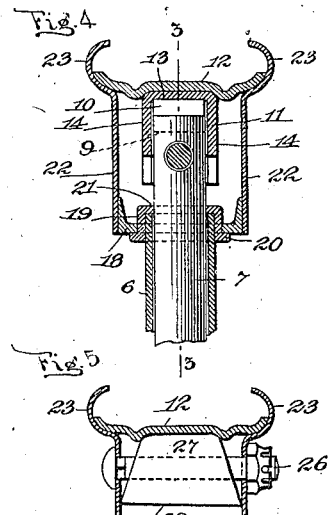
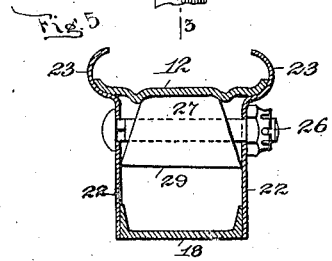
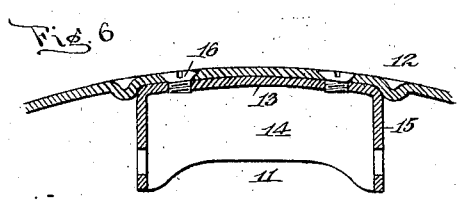
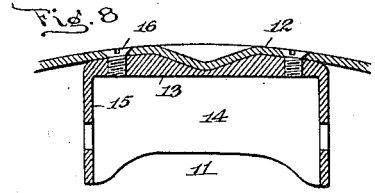
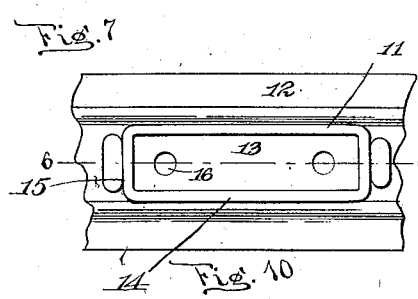
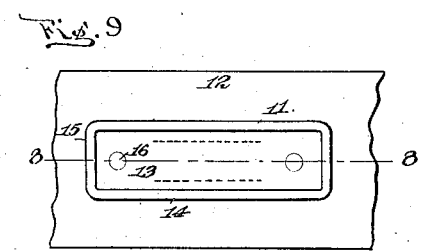
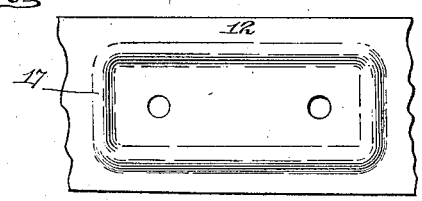
Inventor
Samuel Grossman
by Schechter & ...
his Attorneys Patented Sept. 25, 1923.

1,468,714

UNITED STATES PATENT OFFICE.

SAMUEL GROSSMAN, OF NEW YORK, N. Y.

RESILIENT WHEEL.

Application filed January 31, 1920. Serial No. 355,315.

*To all whom it may concern:*

Be it known that I, SAMUEL GROSSMAN, a citizen of the United States, and a resident of the city of New York, borough and county of the Bronx, and State of New York, have invented a certain new and useful Improved Resilient Wheel, of which the following is a specification.

The invention relates to wheels for automobiles and other vehicles, and, while being composed largely of metal, will be resilient to such a degree that vibrations due to road shocks and tractive and driving forces will be taken up in the wheel and not be transmitted to the body of the vehicle, and is of the same general type as that shown in my Patent No. 1,314,643, of September 2, 1919.

One object of the invention is to provide a wheel which will have the general appearance and riding qualities of one having a pneumatic tire, but which will not be subject to punctures, blow-outs and other dangers to which pneumatic tires are subjected.

A further object is to produce a wheel in which the hub may be movable radially relatively to the rim or felloe, and in which the relatively movable elements may be lubricated.

A further object is to produce a simple and efficient resilient wheel, which will be light in weight, strong and rigid in construction where rigidity is required, which may be easily assembled, and in which those elements which are rigidly secured together may be permanently affixed as by welding.

A still further object is to produce a solid tire of resilient material which may be readily affixed to the wheel, and which will not creep on the felloe.

A further object is to provide means for enclosing the relatively movable parts of the tire, and for providing additional support for the tire.

A further object of the invention, is to produce a device of the character described, which is extremely simple in construction, neat and attractive in appearance, thoroughly reliable and efficient in its purpose, and inexpensive to manufacture.

With these and other objects in view to be more fully set forth hereinafter, the invention consists in the novel construction, combination of elements, and arrangement of parts which will be exemplified in the construction hereinafter described in the specification and illustrated in the accompanying drawings considered together or separately.

The inventive idea involved is capable of receiving a variety of mechanical expressions, some of which for the purpose of illustrating the invention, are shown in the accompanying drawings.

The invention will be first described in connection with the accompanying drawings, wherein similar reference characters are used to designate corresponding parts throughout the several views, and then more specifically defined and indicated in the appended claims.

In the drawings,—

Fig. 1 is a side elevation of a wheel embodying my invention, a portion of the wheel being shown in central section on a plane perpendicular to the axis, and a portion being shown with the tire and cheek plates removed;

Fig. 2 is a section of the line 2—2 of Fig. 1;

Fig. 3 is a detail sectional view taken on the line 3—3 of Fig. 4, and showing a slight modification;

Fig. 4 is a detail section on the line 4—4 of Fig. 3;

Fig. 5 is a detail section view of a modification;

Fig. 6 is a sectional view of another modification, the section being taken on the line 6—6 of Fig. 7;

Fig. 7 is an inside plan view of the felloe shown in Fig. 6;

Figs. 8 and 9 are views corresponding to Figs. 6 and 7 but showing a further modification;

Fig. 10 is a detail view of a still further modified form of felloe;

Fig. 11 is a perspective view of one form of tire rim.

Referring to Figs. 1 and 2 it will be noted that a hollow hub is provided, the same being preferably composed of two opposed annular shells 1 and 2 each provided with an interior flange 3 and an outer flange which in turn is formed with a plurality of semi-cylindrical portions 4 which, when the members 1 and 2 are secured together as shown in Fig. 2 will form radial cylindrical sockets. The shells may be secured together by welding or otherwise and will form an annular chamber as shown.

Carried within the hub chamber is a ring 5 concentric with the hub, and to the ring is secured a plurality of radiating spoke members 6. Each spoke member is composed of a tube and passes through a socket in the hub and may be held in the socket by any suitable means.

Into the bore of each spoke 6 is a cylindrical plunger 7 so fitted in the spoke as to be capable of free movement longitudinally thereof. A coil spring 8 is disposed in each spoke between the ring 5 and plunger and normally tends to move the latter outwardly. The outer end of each plunger is provided with a semicylindrical recess 9 in which is disposed an antifriction roller 10, and the roller of each spoke is adapted to engage against the bottom of a frame 11 rigidly secured to the inner side of a tire rim 12, in axial alignment with each spoke. Each frame 11 is composed of the bottom 13, side members 14 and end members 15, and is preferably secured to the rim 12 by means of bolts 16. The bolts 16 are employed to secure the frames in position during assembling. The frames 11 and rim 12 are so constructed and arranged that shearing strains are not put upon the bolts 16. As shown in Fig. 1 the material of the rim 12 is struck up at each end of a frame to form a protuberance or ridge 17 which will prevent the box from creeping around the rim. The bottom of the frame is convexed laterally of the box shown in Fig. 2 and fits into a concave depression in the rim to prevent movement of the frame axially of the wheel. The bolts 16 are preferably provided with screw heads countersunk in the rim 12 whereby the outer surface of the latter may be flush.

I desire it distinctly understood that I do not limit myself to the use of light weight bolts, but that I can utilize bolts of sufficient strength to withstand any strain put upon them so as to eliminate the various other elements and combinations previously mentioned.

In Figs. 3, 4, 5, 6, 7, 8, 9, 10 and 11 are shown various modified forms of the means for preventing relative movement of a frame and the rim. Provision is made, however, for permitting more or less movement of the plungers circumferentially of the rim 12 through the cushioned connection between the outer end of each plunger and the frame with which it cooperates as shown and described in detail in my patent above referred to.

Carried on the outer ends of the spoke 6 is an annular channel member 18 spaced a short distance inside the rim 12 and normally concentric thereto. The ends of the spokes project a short distance beyond the channel ring 18 and each spoke is provided with a nipple cap 19. The caps 19 are preferably hardened steel and project through the ring 18. Each cap is provided with an outwardly projecting flange 20 at one end, and the said flange cooperates with the inner surface of the ring 18. The outer end of each cap is provided with an inwardly projecting peripheral flange 21 which projects over the outer end of its spoke whereby the spoke tube is rigidly secured between the ring 18 and the ring 5 whereby the said rings are maintained in concentric relation.

The flange 21 projects inwardly beyond the wall of the spoke tube as shown in Fig. 3 and has a close working fit with the plunger 7 whereby the latter will not engage the bore of the spoke tube and the bearing of the plunger will be on the hardened cap 19 and not on the comparatively soft tube 6 which therefore may be made of ordinary stock tubing.

The cap 19 is fastened preferably by spot welding to the spoke tube 6 or ring 18 or both whereby a strong and rigid structure will be produced at a minimum cost.

A pair of annular cheek plates 22 are provided to enclose the space between the tire rim 12 and the channel ring 18. Each cheek plate comprises a substantially flat ring the inner diameter of which is the same as that of the ring 18 and the outer diameter is somewhat greater than that of the rim 12. The cheek plate not only acts as a support for the rubber tire to hold the latter in place and also to keep the dirt and water out, but the said cheek plates also act as a reinforcing member to the rim 12, and by reason thereof it enables me to use lighter material.

The outer edge of each cheek plate is rolled to form an annular bead 23 for the purpose of giving added rigidity to the plate 22 and the edge of each bead 23 is adapted to engage a groove or recess 24, one on each side of a solid rubber tire 25 which is carried on the rim 12. The edges of the rim 12 are preferably curved to fit into the hollows of the beads 23 whereby the rim 12 and tire 25 will derive additional support from the cheek plates. The edges of the rim 12 being enclosed by the cheek plates will be protected from injury, as will the inner edges of the tire.

The cheek plates are secured together and to the rim 12 by means of bolts 26 disposed, one between each pair of spokes. Each alternate bolt 26 passes through a bracket 27 carried by the rim 12. The brackets 27 may conveniently be made of sheet metal of the form shown with the base members 28 welded or otherwise secured to the rim 12. The bolts 26 pass freely through the brackets and the latter are tapered in shape as shown in Figs. 2 and 5. The inner end 29 of each bracket is of the same width as the rim 18 while the outer end at the base member 28 is somewhat narrower. By this construction when the bolts 26 are set up the outer edge of each cheek plate may be sprung inward to more or less compress the tire, but the inner edge of the cheek plates will not be clamped to the ring 18 whereby the rim 12 and tire 25 may assume a position eccentric with the ring 18 and hub.

When headed bolts 16 are employed as shown in Fig. 1, recesses 30 must be formed in the inner periphery of the tire 25, for the reception of such heads.

The hub may be filled with lubricating material by means of an opening 36, which may be closed by any desired means, and the lubricant will be free to travel throughout the wheel. The clamping action of the cheek plates 22 against the curved edges of the rim 12 will prevent the lubricant from coming in contact with the rubber tire.

In accordance with the provisions of the patent statute, I have described the principle of my invention together with the apparatus which I now consider to represent the best embodiment thereof, but I desire it understood that my invention is not confined to the particular form of apparatus herein shown and described, the same being merely illustrative, and that the invention can be carried out in other ways without departing from the spirit of my invention, and therefore, I claim broadly the right to employ all equivalent instrumentalities coming within the scope of the appended claims, and by means of which objects of my invention are attained, and the new results accomplished, as herein set forth, as it is obvious that the particular embodiment herein shown and described is only one of many that can be employed to attain these objects and accomplish these results.

Having now described my invention, what I claim as new and desire to secure by Letters Patent is as follows:—

1. In a wheel of the character described, a hub, spokes secured to the hub, said spokes being tubular, a ring bearing against the spokes and concentric with the hub, a member carried within and adapted to move longitudinally of each spoke, said member extending beyond its spoke, and an element carried by the ring, and forming the bearing of the member and an abutment for the spoke.

2. In a wheel of the character described, a hub, spokes secured to the hub, said spokes being tubular, a ring concentric with the hub, a member carried within and adapted to move longitudinally of each spoke, said member extending beyond its spoke, and an element formed with oppositely disposed flanges and forming the bearing of the member and a union for the ring and the end of the spoke.

3. In a resilient wheel, the combination with a hub construction, comprising an annular central portion an inner rim and a series of hollow spokes connecting said central portion to said rim, of an outer rim spaced from the aforesaid inner rim, said outer rim being provided with integral inwardly disposed ridges; a series of radially extensible spoke extensions adapted to reciprocate within said spokes; elements positioned between said rims to secure the outer ends of said extensions to said outer rim, and means for detachably securing said elements to said outer rim.

4. A wheel of the character described, comprising a hub, tubular spokes secured to the hub, a ring concentric with the hub, a plunger movable longitudinally of each spoke, a hardened element forming an abutment for the spoke and a bearing for the plunger, a spring cooperating with each plunger, a roller carried by each plunger, a tire rim, a plurality of frames carried on the interior of the rim, each frame adapted to be engaged by a roller, and means for preventing relative movement of the rim and frames.

5. A wheel of the character described, comprising a hub, tubular spokes secured to the hub, a ring concentric with the hub, a plunger movable longitudinally of each spoke, a hardened element forming an abutment for the spoke and a bearing for the plunger, a spring cooperating with each plunger, a roller carried by each plunger, a tire rim, a plurality of frames carried on the interior of the rim, each frame adapted to be engaged by a roller, and protuberances on the interior of the rim for preventing relative movement of the rim and frames.

6. A wheel of the character described, comprising a hub, radiating tubes permanently secured to the hub to form spokes, a ring concentric with the hub, said spokes being separate from and passing through the ring, a cap permanently secured to each spoke and to the ring, there being a perforation in each cap in axial alignment with the bore of the tube, said perforation being of less diameter than the bore of the tube, a plunger carried in each tube and projecting through the cap, said plunger having a tight working fit with the perforation and a loose fit with the bore, a spring in each bore cooperating with plunger, an anti-friction roller carried by the outer extremity of each plunger, a circular rim carried on the rollers, and a tire secured to the rim.

7. A wheel of the character described, comprising a hub, spokes carried by the hub, a ring carried by the outer extremities of the spokes and concentric with the hub, movable members projecting from the spokes beyond the ring, a circular rim supported on the members, an annular cheek plate engaging each edge of the ring and rim, and inwardly flared brackets carried by the rim for supporting the cheek plates.

8. A wheel of the character described, comprising a hub, spokes carried by the hub, a ring carried by the outer extremities of the spokes and concentric with the hub, movable members projecting from the spokes beyond the ring, a circular rim supported on the members, an annular cheek plate engaging each edge of the ring and rim, and inwardly flared brackets carried by the rim for supporting the cheek plates, a tire carried by the rim, the said cheek plates engaging the tire.

9. A wheel of the character described, comprising a hub, spokes carried by the hub, a ring carried by the outer extremities of the spokes and concentric with the hub, movable members projecting from the spokes beyond the ring, a circular rim supported on the members, an annular cheek plate engaging each edge of the ring and rim, and means carried by the rim for supporting the cheek plates, a tire carried by the rim, the said cheek plates engaging the tire, and means for holding the cheek plates into engagement with the rim, the said rim resting upon the cheek plates, permitting said plates to be moved toward each other and relative to the rim.

This specification signed this 27th day of January, 1920.

SAMUEL GROSSMAN.